Patented Nov. 25, 1952

2,619,505

UNITED STATES PATENT OFFICE 2,619,505

PROCESS FOR THE PREPARATION OF α-HALO-p-NITROACETOPHENONE

Joseph M. Wilkinson, George W. Pedlow, and Robert W. Wynn, Easton, Pa., assignors to General Aniline & Film Corporation, New York, N. Y., a corporation of Delaware No Drawing. Application July 11, 1950, Serial No. 173,225

4 Claims. (Cl. 260—592)

This invention relates to a process of preparing α-halo-p-nitroacetophenone and to p-nitro-α-methoxystyrene formed as an intermediate in such process.

p-Nitroacetophenone is a highly desired product for the preparation of α-bromo-p-nitroacetophenone which is utilized in the synthesis of the anti-biotic, chloromycetin:

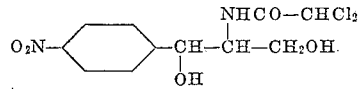

p-Nitroacetophenone prepared by a previous method involves the acylation of the sodium or the magnesium methoxy or ethoxy derivative of diethylmalonate with p-nitrobenzoyl chloride. The resulting dimethyl- or diethyl-acylmalonate was hydrolyzed and decarboxylated in the presence of glacial acetic and sulfuric acids by the usual method for the ketonic cleavage of certain β-keto esters.

It has also been prepared by the hydration of p-nitrophenyl propiolic acid followed by decarboxylation, condensation of nitrobenzoyl chloride with acetoacetic ester followed by hydrolysis or decarboxylation, by the air oxidation of p-nitroethylbenzene in the presence of ($CrO_3$) at 145° C., by the nitration and subsequent oxidation of methylphenylcarbinol, and by treatment of p-nitroethylbenzene with t-butylnitrite and sodium t-butoxide followed by hydrolysis of the resulting oxime.

All of the foregoing methods are involved, time consuming, and use relatively expensive and sometimes unavailable chemicals. In addition, unsatisfactory conversions are obtained in the synthesis.

The preparation of p-nitroacetophenones can also be achieved by the nitration of α-(chloromethyl)-benzylmethyl ether followed by dehydrohalogenation and hydrolysis, as disclosed in copending application Serial No. 173,224, filed on even date, now U. S. Patent 2,573,080, and entitled "α-(Mononitro-Monocyclic-Aryl)-β-Halo-Ethyl Lower Alkyl Ethers," by Joseph M. Wilkinson et al. This method has several disadvantages in that it requires (1) a large excess over theory of relatively expensive fuming nitric acid, only a fraction of which is consumed in the nitration of the ether, and (2) a costly fractional distillation to separate the p-isomer from the mixture of o-, m-, and p-nitro-isomers.

It is an object of the present invention to provide an improved method of preparing p-nitroacetophenone which is subsequently brominated to yield α-bromo-p-nitroacetophenone.

A further object is 4-nitro-α-methoxystyrene.

Other objects and advantages will become apparent from the following description.

The foregoing objects are accomplished by reacting styrene with chlorine and methanol, either in the presence or absence of an acid binding agent, at a temperature of —5° to 5° C. for a time sufficient to permit the equivalent weight of chlorine to be absorbed. During the reaction, which takes about 4 hours, a mixture consisting of about 70% of α-(chloromethyl)-benzylmethyl ether and 30% of styrene dichloride is formed. The latter, which is an impurity, need not be isolated, and the mixture as such is nitrated to yield α-(chloromethyl)-4-nitrobenzylmethyl ether, and o- and m-isomers, and nitration products of styrene dichloride. The mixture of the nitro-isomers is then dehydrochlorinated by heating, preferably under reflux, with an alcoholic solution of sodium or potassium hydroxide to yield 4-nitro-α-methoxystyrene, o- and m-isomers, and products from nitrated styrene dichloride.

The 4-nitro-α-methoxystyrene is separated by simply cooling and filtering the crude nitrated reaction mixture after the sodium or potassium chloride is removed. 4-nitro-α-methoxystyrene is new and constitutes a part of our invention.

The 4-nitro-α-methoxystyrene is hydrolyzed to p-nitroacetophenone by heating in acetic acid containing water with or without a small amount of another acid, such as hydrochloric acid, sulfuric, phosphoric, hydrobromic acid, p-toluene-sulfonic, trichloroacetic, etc. Any one of these acids may be added prior to or during the hydrolysis reaction and prior to the bromination reaction. In either case, the presence of the acid, preferably, a hydrohalic, is desirable because it helps to initiate or accelerate the bromination of the 4-nitroacetophenone. The bromination or chlorination of the hydrolyzed product to yield the α-bromo or α-chloro-p-nitroacetophenone is carried out in the known manner.

An improvement in the foregoing process is that the preparation of α-halo-p-nitroacetophenone of 98% purity, the intermediate, α-(chloromethyl)-4-nitrobenzylmethyl ether, need not be isolated before proceeding with the dehydrochlorination and halogenation steps.

The process steps involved with bromination of the final product are illustrated by the following schematic equation. The bracketed compounds are not isolated.

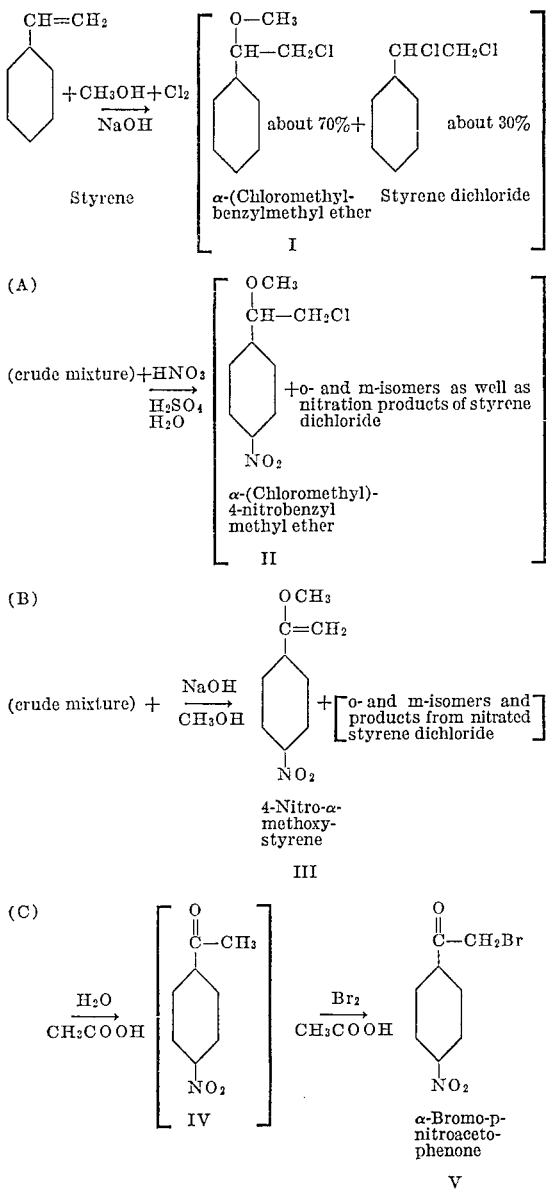

The nitration (A) of either the distilled α-(chloromethyl)-benzylmethyl ether (I) or the crude mixture of α-(chloromethyl)-benzylmethyl ether and styrene dichloride to yield α-(chloromethyl)-4-nitrobenzylmethyl ether (II) is carried out by employing only slightly more than the theoretical amount of mixed nitric acid consisting of approximately 30% of nitric acid, 60% of sulfuric acid, and 10% of water by weight. Appreciable variations of this composition result in lower yields of the product. The actual amount of nitric acid in the mixed nitric acid mixture should be such as to nitrate the α-(chloromethyl)-benzylmethyl ether as such or in admixture with styrene dichloride.

The nitration reaction is quite exothermic, and it is preferable that it be carried out at a temperature ranging from —5° to 5° C. for a period of time ranging from ½ to 2 hours. However, the reaction may be carried out at higher or lower temperatures. Higher temperatures result in lower yield of product, and lower temperatures prolong the reaction time. The use of 100% sulfuric acid as diluents in the mixed acid nitration decomposes α-(chloromethyl)-benzylmethyl ether with the formation of a gummy substance, presumably a polymer. With 77% sulfuric acid as a diluent, a low yield is obtained. With 77% nitric acid alone, an impure product was obtained.

For practical commercial purposes, it is preferable to nitrate the crude mixture since it eliminates the fractional distillation of substantially pure α-(chloromethyl)-benzylmethyl ether from the chlorinated reaction mixture.

A further improvement in the foregoing process steps is in the method (B) of isolating 4-nitro-α-methoxystyrene as a new product.

In the process referred to in the aforementioned copending application of Wilkinson et al., it is necessary to add water at the end of the dehydrochlorination step to yield 4-nitro-α-methoxystyrene in the form of a precipitate of a semicrystalline mass which had to be reslurried in fresh alcohol. According to the present process, this new product is isolated by filtering the sodium chloride from the hot methanol solution and then cooling and filtering the product followed by washing with a little fresh methanol. The 4-nitro-α-methoxystyrene is obtained in excellent purity from a highly contaminated reaction mixture containing a minimum of about six products.

The hydrolysis (C) of 4-nitro-α-methoxystyrene (III) to p-nitroacetophenone (IV) is combined with the halogenation of p-nitroacetophenone to α-bromo- or α-chloro-p-nitroacetophenone (V) as a one-kettle reaction by heating the 4-nitro-α-methoxystyrene in acetic acid containing a small amount of water with or without another acid. The halogenation of the p-nitroacetophenone is carried out in the conventional manner as indicated in the following example.

From the foregoing procedural steps α-bromo-p-nitroacetophenone can be isolated in a purity of 98% as the end product of a series of five reactions starting with commercial styrene in which only one of the intermediates, 4-nitro-α-methoxystyrene, is isolated.

The following example will serve to illustrate certain ways in which α-bromo-p-nitroacetophenone has been prepared, but is not to be construed as limiting the invention.

*Preparation of α-(chloromethyl)-benzylmethyl ether*

To a solution of 96 grams of sodium hydroxide in 1000 mls. of methanol, 208 grams of commercial styrene were added and the resulting solution chilled to —5° to 0° C. Chlorine gas was passed into the mixture with stirring at the same temperature until about 162 grams of chlorine had been absorbed which took about 3 to 3½ hours. The amount of chlorine may vary between 155 to 162 grams. Throughout the reaction the pH of the chlorination mixture remained above 10 and the addition of chlorine was discontinued when the pH reached 6 to 7.

The copious white precipitate was filtered off and washed once with methanol. The absence of hypochlorite was verified with acidified potassium iodide solution. If the filtrate at this point is slightly alkaline (pH of 7 to 8), it should be brought back to a pH of 5 to 6 with a small amount of hydrochloric acid. The methanol was stripped off through a column at atmospheric pressure until two layers, one alcohol and one oil, were formed in the reaction vessel. (About 90 to 95% of methanol was removed.) The layers were separated and the oily product washed with water to remove the dissolved methanol and sodium chloride.

There were obtained between 315 to 317 grams of a crude product which amounts to a yield of 92–93% of theory.

From methoxyl determinations of the crude products, a 70–75% content of α-(chloromethyl)-benzylmethyl ether was indicated. The crude mixture was nitrated in the following manner.

*Nitro-isomers*

85 grams of the crude mixture were cooled in an acetone-Dry Ice bath to 0° C. The temperature was maintained between 0° to —3° C. 102 grams of an acid nitration mixture (33.3% nitric acid, 66.7% of sulfuric acid) and 11.2 grams of water were added dropwise over a ¾ to 1 hour period. After the addition was completed, the nitrated mixture was stirred at 0° to —3° C. for 1¾ to 2 hours when it became quite viscous. The viscous mixture was then poured into 500 grams of water with stirring. The oily layer was separated from the water layer and washed with two 300 gram portions of warm water (40–45° C). The oily layer is then dehydrochlorinated in the following manner.

*Dehydrochlorination*

To 198 grams of methanol 25 grams of sodium hydroxide were added with stirring. After the heat of the solution had subsided, the solution was cooled to 40 to 45° C. and the oil obtained above added in a steady stream, which took about 15 minutes' time. The mixture was refluxed for about 45 minutes, the sodium chloride filtered from the hot solution and the salt cake washed with 40 grams of hot methyl alcohol. The filtrate was cooled to 5° C. and held at this temperature for 15 minutes. The precipitated product was filtered and washed with 40 grams of methyl alcohol cooled to 5° C.

A yield of 33.2 to 35 grams, 37–39% of the theoretical yield, of dried 4-nitro-α-methoxystyrene, melting at 83 to 84.5° C., was obtained.

*Ether cleavage and bromination*

A mixture of 44.8 grams of 4-nitro-α-methoxystyrene, 50 grams of glacial acetic acid and 5 grams of water was heated to reflux for 45 minutes. The mixture was cooled to 40° C. 25 grams of glacial acetic acid were added and the temperature adjusted to 35 to 38° C.

40 grams of bromine were added dropwise to the cooled mixture at such a rate that there was no accumulation of unreacted bromine. It is sometimes desirable to add 5 to 6 drops of concentrated hydrochloric acid prior to the addition of bromine. The bromination may be slow to start and proceeds very slowly at first, becoming more rapid as the reaction proceeds.

After the addition of bromine is complete, the reaction mixture is stirred at 35° C. for about ½ hour, cooled to 14 to 15° C. and maintained at this temperature for about 15 minutes. It is then filtered and the precipitate washed with 25 grams of cold glacial acetic acid and two 100 gram portions of cold water. A yield of 52 grams, 85% of the theoretical yield, of dried 4-nitro-α-bromoacetophenone having a melting point of 96 to 98° C. was obtained.

Instead of liquid bromine, a stream of chlorine gas may be used and the resultant 4-nitro-α-chloroacetophenone isolated.

We claim:

1. The process of preparing α-halo-p-nitroacetophenone which comprises reacting styrene with chlorine and methanol, nitrating the reaction product with a mixed acid consisting of approximately 30% of nitric acid, 60% of sulfuric acid, and 10% of water by weight, at a temperature ranging from —5° to 5° C., dehydrohalogenating the mononitro derivative in the presence of alcoholic alkali, separating the 4-nitro-α-methoxystyrene and hydrolyzing it to p-nitroacetophenone with acetic acid containing a small amount of water and halogenating the hydrolyzed product with a halogen selected from the class consisting of bromine and chlorine.

2. The process of preparing α-halo-p-nitroacetophenone which comprises reacting styrene with chlorine and methanol in the presence of an acid binding agent, nitrating the reaction product with a mixed acid consisting of approximately 30% of nitric acid, 60% of sulfuric acid, and 10% of water by weight, at a temperature ranging from —5° to 5° C., dehydrohalogenating the mononitro derivative in the presence of alcoholic alkali, separating the 4-nitro-α-methoxystyrene and hydrolyzing it to p-nitroacetophenone with acetic acid containing a small amount of water and halogenating the hydrolyzed product with a halogen selected from the class consisting of bromine and chlorine.

3. The process of preparing α-halo-p-nitroacetophenone which comprises nitrating one molecular equivalent of α-(chloromethyl)-benzylmethyl ether to the mononitro derivative thereof with a mixed acid consisting of approximately 30% of nitric acid, 60% of sulfuric acid, and 10% of water by weight, at a temperature ranging from —5° to 5° C., dehydrochlorinating the said mononitro derivatives in the presence of an alcoholic alkali, separating the 4-nitro-α-methoxystyrene and hydrolyzing it to p-nitroacetophenone with acetic acid containing a small amount of water and subsequently halogenating the p-nitroacetophenone with a halogen selected from the group consisting of bromine and chlorine to an α-halo-p-nitroacetophenone.

4. The process of preparing α-bromo-p-nitroacetophenone which comprises reacting styrene with chlorine and methanol in the presence of sodium hydroxide, nitrating the reaction product with a mixed acid consisting of approximately 30% of nitric acid, 60% of sulfuric acid, and 10% of water by weight, at a temperature ranging from 0° to —3° C., dehydrochlorinating the mononitro derivative in the presence of a methanol-sodium hydroxide solution, separating the 4-nitro-α-methoxystyrene and hydrolyzing it to p-nitroacetophenone with acetic acid containing a small amount of water, and brominating the p-nitroacetophenone to α-bromo-p-nitroacetophenone.

JOSEPH M. WILKINSON.
GEORGE W. PEDLOW.
ROBERT W. WYNN.

REFERENCES CITED

The following references are of record in the file of this patent:

UNITED STATES PATENTS

| Number | Name | Date |
|---|---|---|
| 2,241,200 | Hopff | May 6, 1941 |
| 2,372,562 | Emerson | Mar. 27, 1945 |